US010904822B2

United States Patent
Timson et al.

(10) Patent No.: US 10,904,822 B2
(45) Date of Patent: Jan. 26, 2021

(54) SYSTEM AND METHOD FOR RESTRICTING ACCESS TO A MOBILE COMMUNICATIONS NETWORK

(71) Applicant: CELLXION LIMITED, Caterham (GB)

(72) Inventors: Anthony Timson, Caterham (GB); Michael McTernan, Caterham (GB)

(73) Assignee: CELLXION LIMITED, Caterham (GB)

(*) Notice: Subject to any disclaimer, the term of this patent is extended or adjusted under 35 U.S.C. 154(b) by 0 days.

(21) Appl. No.: 16/295,859

(22) Filed: Mar. 7, 2019

(65) Prior Publication Data

US 2019/0208460 A1 Jul. 4, 2019

Related U.S. Application Data

(63) Continuation of application No. PCT/GB2017/052657, filed on Sep. 11, 2017.

(30) Foreign Application Priority Data

Sep. 9, 2016 (GB) .................................. 1615372.8

(51) Int. Cl.
*H04W 48/04* (2009.01)
*H04W 24/10* (2009.01)
(Continued)

(52) U.S. Cl.
CPC ........... *H04W 48/04* (2013.01); *H04W 24/10* (2013.01); *H04W 40/244* (2013.01); *H04W 48/16* (2013.01)

(58) Field of Classification Search
CPC .. H04L 2209/80; H04L 63/304; H04W 48/08; H04W 84/02; H04W 24/10; H04W 40/244; H04W 48/16
See application file for complete search history.

(56) References Cited

U.S. PATENT DOCUMENTS

2004/0132440 A1    7/2004   Duplessis
2007/0183374 A1*   8/2007   Classon ............ H04W 36/0085
                                                                              370/338
(Continued)

FOREIGN PATENT DOCUMENTS

EP              0998159 A1     5/2000
WO         2007027699 A2    3/2007
(Continued)

OTHER PUBLICATIONS

UKIPO Search Report dated Feb. 13, 2017 for Application No. GB1615372.8.
(Continued)

*Primary Examiner* — Mewale A Ambaye
(74) *Attorney, Agent, or Firm* — EIP US LLP (57) ABSTRACT

There is described a system for restricting access to a mobile communications network for mobile communication devices within a restricted area. The system comprises at least one transmitter operable to transmit a beacon signal for reception by mobile communication devices within the restricted area and an access control entity, communicable with the mobile communication device via a base station. The access control entity instructs a mobile communication device to perform at least one measurement in regard of the beacon signal from each transmitter and then to provide measurement data corresponding to said performed measurement to the access control entity. The access control entity then analyses the measurement data provided by the mobile communication device and based on that analysis decides whether or not to provide the mobile communication device with access to a service of the mobile communications network.

15 Claims, 4 Drawing Sheets

(51) Int. Cl.
*H04W 40/24* (2009.01)
*H04W 48/16* (2009.01)

(56) References Cited

U.S. PATENT DOCUMENTS

| | | | | |
|---|---|---|---|---|
| 2009/0311963 | A1* | 12/2009 | Haverty | H04K 3/226 455/63.1 |
| 2010/0159877 | A1* | 6/2010 | Salkini | H04W 48/04 455/411 |
| 2012/0183374 | A1* | 7/2012 | Fuchs | B42B 5/08 412/7 |
| 2012/0238268 | A1* | 9/2012 | Radulescu | H04W 24/10 455/435.1 |
| 2013/0217408 | A1* | 8/2013 | DiFazio | H04W 64/003 455/456.1 |
| 2014/0106740 | A1* | 4/2014 | Zhou | H04W 24/10 455/423 |
| 2015/0094057 | A1* | 4/2015 | Lu | H04W 8/005 455/434 |
| 2015/0237193 | A1 | 8/2015 | Zeilingold et al. | |
| 2016/0277974 | A1* | 9/2016 | Persson | H04W 48/16 |
| 2018/0234889 | A1* | 8/2018 | Baghel | H04W 72/0486 |

FOREIGN PATENT DOCUMENTS

| WO | 2008010806 A1 | 1/2008 |
|---|---|---|
| WO | 2012160560 A1 | 11/2012 |

OTHER PUBLICATIONS

International Search Report and Written Opinion dated Dec. 18, 2017 for PCT Application No. PCT/GB2017/052657.

\* cited by examiner

SYSTEM AND METHOD FOR RESTRICTING ACCESS TO A MOBILE COMMUNICATIONS NETWORK

CROSS-REFERENCE TO RELATED APPLICATIONS

This application is a continuation of International Application No. PCT/GB2017/052657, filed Sep. 11, 2017, which claims priority to UK Application No. GB1615372.8, filed Sep. 9, 2016, under 35 U.S.C. § 119(a). Each of the above-referenced patent applications is incorporated by reference in its entirety.

BACKGROUND OF THE INVENTION

Field of the Invention

The present invention relates to restricting access to a mobile communications network, and has particular relevance to a method in which access to the mobile communications network is restricted for mobile communication devices within a particular location.

Description of the Related Technology

Mobile communications networks are becoming more and more ubiquitous. There are, however, some locations in which it is desired that access to a mobile communications network be restricted. One example of such a location is the immigration area in an airport. Another example of such a location is a courthouse or an embassy. Further examples of such areas are lecture halls, schools, cinemas and correctional institutions.

Various systems are already known for restricting access to a mobile communications network within a particular location. Such systems are typically referred to as Managed Access Systems (MAS's). In some of these systems, access to the mobile communications network can be permitted for certain mobile communication devices (such as cellular phones, also known as mobile phones and handy phones), identified for example by the IMSI associated with the mobile communications device appearing on an "allowed" list, but restricted for mobile phones whose IMSI does not appear on the "allowed" list. In this way, for example, passport officers within an immigration area of an airport may be able to use their mobile communications devices while arriving passengers passing through immigration are not able to do so.

A problem with such a system is that the restricted location is not well-defined, and can extend to areas in which there is no reason why the use of mobile communication devices need be restricted.

SUMMARY

According to a first aspect of the present invention, there is provided a system for restricting access to a mobile communications network for mobile communication devices within a restricted area. The system comprises at least one transmitter operable to transmit a beacon signal for reception by mobile communication devices within the restricted area and an access control entity, communicable with the mobile communication device via a base station. The access control entity instructs a mobile communication device to perform at least one measurement in regard of the beacon signal from each transmitter and then to provide measurement data corresponding to said performed measurement to the access control entity. The access control entity then analyses the measurement data provided by the mobile communication device and based on that analysis decides whether or not to provide the mobile communication device with access to a service of the mobile communications network.

The beacon signal transmitters need have no other functionality. In particular, they need not have any capability to process a wireless signal from the mobile communication device, or to transmit any signal other than the beacon signal to the mobile communication device. Further, the beacon signal transmitters do not need to be time-synchronised or networked. Accordingly, the beacon signal transmitters can be simple, inexpensive devices in comparison with a base station of a mobile communications network, and straightforward to install.

The beacon signal transmitters can be deployed around the perimeter of a restricted area or throughout a restricted area.

In an example, low-power beacon signal transmitters may be provided in an area in which access to a service provided by the mobile communications network is to be restricted. The power level of the low-power beacon signal transmitters may be, for example, 0 dBm (i.e. 1 mW). In this example, if the measurement data indicates the presence of a beacon signal transmitter, the access control entity restricts access to the mobile communications network.

In another example, as well as the low-power beacon signal transmitters in an area in which access to a service provided by the mobile communications network is to be restricted, further low-power beacon transmitters can be provided in neighbouring areas. In this example, if the measurement data indicates the presence of a beacon signal transmitter within the restricted area and the presence of a beacon signal transmitter in a neighbouring area, then the access control entity can decide to allow access to the mobile communications network. The decision to allow access may be performed based on a comparison of the measurement data for beacon signal transmitters within the restricted area and beacon signal transmitters outside of the restricted area.

In another example, beacon signal transmitters are provided outside of a restricted area but not inside the restricted area. The access control entity can decide to restrict access for mobile communication devices communicating with a subject base station unless the measurement data indicates the presence of a beacon signal transmitter. Such an arrangement may be advantageous if the restricted area is a substantial portion of the coverage area of the subject base station, or if it is desirable not to deploy beacon signal transmitters within the restricted area.

In a further example, beacon signal transmitters may be deployed around a restricted area with directional antennas arranged to direct the beacon signal into the restricted area. Such beacon signal transmitters may have a power of as much as 37 dBm (5 W). In this way, whether or not a mobile communication device is within the restricted area can be determined based on the measurements of beacon signals transmitted by the beacon signal transmitters, and accordingly the access control entity can decide whether to restrict access based on the measurement data from the mobile communication device.

The base station via which the access control entity communicates with the mobile communication device may be a base station of the mobile communications network. If this is the case, then the mobile communications network may provide, via that base station, details of the beacon signal transmitters to the mobile communication device to facilitate measurements of the beacon signals.

Alternatively, the base station via which the access control entity communicates with the mobile communication device may be a base station of an independent mobile communications network. If this is the case, then neighbouring base stations from one or more public land mobile networks may provide details of that base station to the mobile communication device to facilitate handover to that base station. Such an independent mobile communications network may permit signalling to other mobile communication networks via a network gateway.

Further features and advantages of the invention will become apparent from the following description of examples of the invention, which is made with reference to the accompanying drawings.

DETAILED DESCRIPTION OF CERTAIN INVENTIVE EMBODIMENTS

Figure 1:
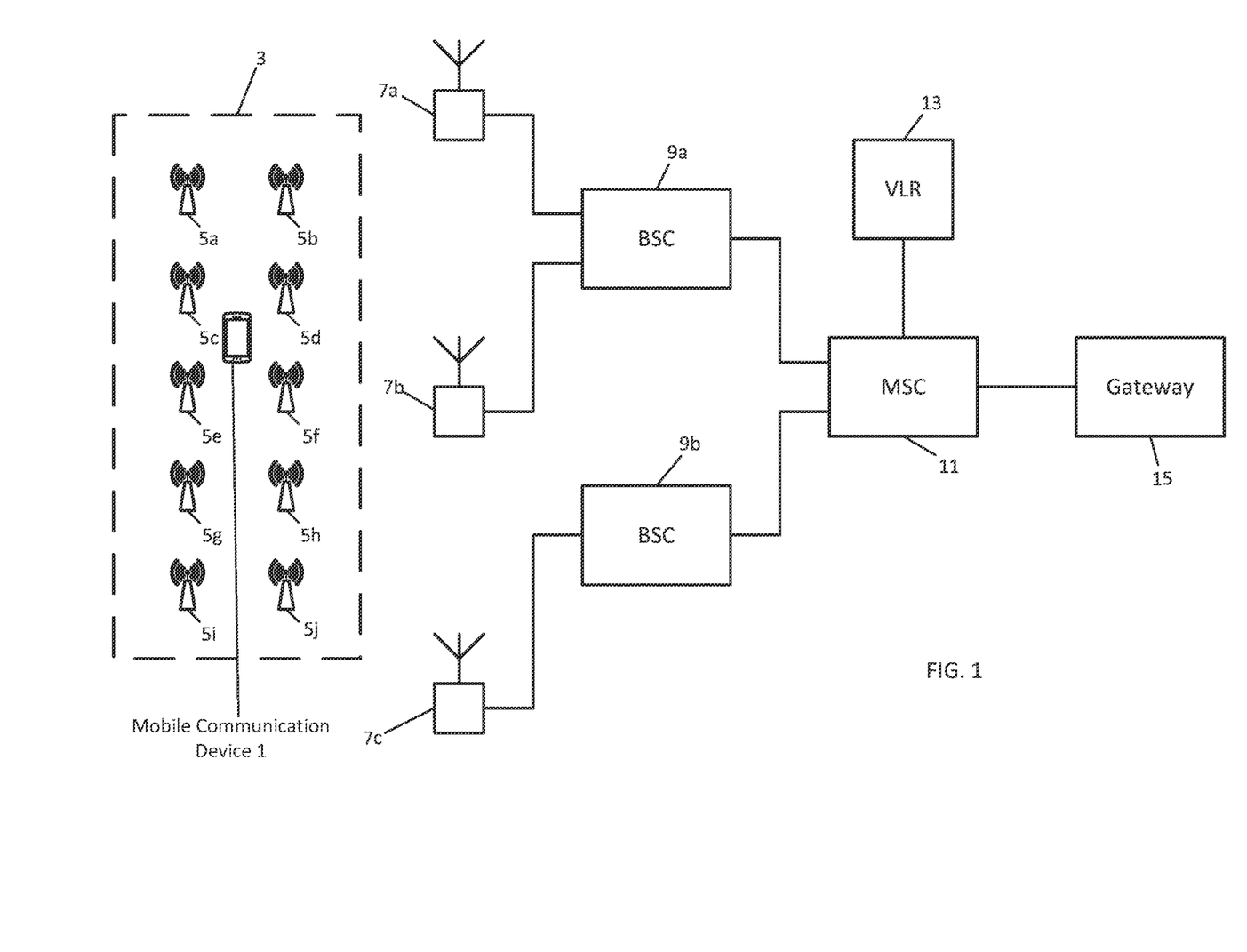
FIG. 1 schematically shows a first example of an implementation of the present invention.

FIG. 1 schematically shows a system for controlling access of a mobile communication device 1 within a restricted area 3 (represented by the dashed block) to a mobile communications network. An example of restricted area 3 may be an immigration hall at an airport. In this example, the mobile communications network conforms to the GSM standards.

As shown in FIG. 1, a plurality of measurement beacons 5a-5j are disposed within the restricted area. A measurement beacon 5 is a transmitter that transmits a beacon signal. In this example, each measurement beacon 5 is effectively a downlink only base station (BTS), which provides enough information (it is recommended a full BCCH with cell barring enabled, although a lesser subset (ie: FB/SB including BSIC) could work) for the mobile communication device 1 to measure its beacon signal and report the measurement to the mobile communications network for determination of action (ordinarily this would be a handover).

The measurement beacons 5 are programmed in a way to make them uniquely identifiable within a code set and can be of varying power depending on the desired area of coverage. Due to this ability to uniquely code each beacon it is possible to have many in a small area and identify each one from which a beacon signal is received, giving the benefit of providing coarse positional information.

The mobile communication device 1 communicates with base stations 7a-7c of a public land mobile network (PLMN). In FIG. 1, two of the base stations 7a,7b are connected to a first base station controller 9a while the other base station is connected to a second base station controller 9b. The first and second base station controllers 9a,9b are connected to a mobile switching centre 11, which is in turn connected to a Visitor Location Register (VLR) 13 and a gateway 15.

GSM and other cellular protocols provide for a list of neighbour cells to be advertised from a serving base station. In the case of GSM, this is advertised in the System Information 5 message, carried on a dedicated channel during a communication session between a MS and a BTS. ETSI specification GSM04.08 section 9.1.3.7 clearly describes the process for encoding an SI5 message, and section 3.4.1 describes when it should be present.

When a dedicated channel is established, an MS will attempt to measure all the cells which are handover candidates from the SI5 message and return these values to the serving BTS in a Measurement Report. This process is described in GSM04.08 section 3.4.1.2, and GSM05.08, section 8. The pertinent features for this invention are the recovery of ARFCN/RXLEV/RXQUAL and BSIC.

In this example, the operator of the PLMN has allowed the airport to use a block of ten GSM channels to facilitate operation of the invention—a description of each measurement beacon's configuration is illustrated below:

| Location | BCCH | BSIC |
| --- | --- | --- |
| Beacon 5a | 870 | 1 |
| Beacon 5b | 872 | 2 |
| Beacon 5c | 874 | 3 |
| Beacon 5d | 876 | 4 |
| Beacon 5e | 878 | 5 |
| Beacon 5f | 871 | 6 |
| Beacon 5g | 873 | 7 |
| Beacon 5h | 875 | 9 |
| Beacon 5i | 877 | 10 |
| Beacon 5j | 879 | 11 |

This configuration takes into account the properties of channel separation for GSM to work effectively, and the measurement beacons 5 would be of a low power, for instance 0 dBm. Mobile network technology has been designed to allow for determination of multiple cells or at least the dominant cell in an environment where more than one cell can be received on a single ARFCN. In GSM, this is the function of the BSIC. It is required that the network operator puts the list of ARFCN's for the beacons into an SI5 list of its local BTS's that service the airport.

When the user of the mobile communication device 1 attempts to perform any type of activity, for instance making a call, sending an SMS or starting a data session, a dedicated channel is established between the mobile communication device 1 and the serving base station 7. This will trigger the sending of the Measurement Reports to the BSC 9, and these will contain measurements received from cells contained in the SI5 message. It would also be completely normal for this SI5 list to contain the adjacent cells of the network as well as the artificially introduced beacons as the network will still use the non-beacon channels for handover. The standards dictate that at least the top six strongest measured cells must be reported where they can be decoded.

Once a dedicated channel is established, it can be calculated quickly if the user of the MS is in the vicinity of the measurement beacons 5 in the restricted area 3 due to the presence or lack of ARFCN/BSIC combinations deployed at the airport in the measurement reports that the MS will be sending. The RXLEV and RXQUAL will also give a determination of how close the MS is to the beacon.

If there are no measurements received with the ARFCN/BSC combination from the airport then it can be assumed that the MS is not present in the restricted area 5 and therefore the mobile communication device 1 can be given full network access. If however any of the ARFCN/BSIC combinations from the restricted area are received in the measurement reports then it can be deduced that the mobile communications device 1 is in the vicinity of one or more of the measurement beacons 5. Additionally, it is possible to identify an approximate location of the mobile communications device 1 based on the RXLEV for the reported measurement beacons 5. For instance:

| BCCH | BSIC | RXLEV |
|------|------|-------|
| 874  | 3    | 38    |
| 876  | 4    | 35    |
| 878  | 5    | 54    |
| 871  | 6    | 55    |

In the example above, we could deduce that the MS is positioned between measurement beacons 5e and 5f due to the similar RXLEV's from those measurement beacons 5. Analytical software can be used to determine the position of the MS based on the RXLEV's from the MS. Such analytical software typically requires some of the following inputs to estimate a mobile's position in a MAS system:

1) Details of beacon placement, transmit power, antenna facing, channel number and BSIC.
2) RF propagation models based on the above when combined with structural models of the site or facility of interest, including such things as placement and materials for walls, ceilings and floors, ducting and any other significant metallic bodies.
3) RF survey results from walk test of the facility or sites of interest.

Given one or more measurement reports from a mobile, the analytical software can compare the top 6 reported neighbour BSIC and RXLEV values to models formed from the above data to produce estimates as to the likely location or locations of an MS. Collecting successive measurement reports can allow for further accuracy in the positioning estimate by further processing the reported RXLEV values to remove the effect of RF fading by filtering or averaging.

The base stations for the restricted area are configured such that their BA lists for dedicated mode (the SI5 set of messages) include the radio channels (ARFCNs) used by the beacons in the system. An additional modification may also be made to the BTS operation such that dedicated channels are held connected for a minimum amount of time sufficient for:

1) A MS to detect and measure a neighbour cell, or beacon in this case
2) The MS to report the top 6 cells to the BTS in a Measurement Report messages The 3GPP standards define the Measurement Reporting period as 480 ms, and also set requirements on neighbour cell detection and measurement frequency and accuracy. The maximum duration of a dedicated channel is subject to protocol stack guard timers and cannot be indefinite without signalling progress being made, but can be extended towards 10 seconds without problem. The dedicated channel can be held open for a variable duration to allow collection of more or fewer Measurement Reports as required to achieve the required confidence in the analytical result. This may also use prior decisions such that MS's which have already been found to either be within or outside the area of effect are quickly handled without holding resources at the base station for longer than necessary.

The decision making process would be coded in an ordinary network in the MSC 11 in the form of an access control entity, via extensions from the Base Station Controller to forward the measurements as ordinarily the MSC 11 is not aware of radio measurements. To a person skilled in the art, there are several ways to achieve this including proprietary or standards compliant messaging, and it would even be possible to process the measurement reports from a mobile communication device 1 to determine if it is in the restricted area 3 inside the BSC 9, and simply pass a decision message to the MSC 11.

So far as the MSC 11 is concerned, one possible method to implement the access control entity could be an additional step in the MM Location/Routing Update procedure which would follow the identity and optional authentication responses. Once the mobile communications device has been determined to be allowed onto the network through a HLR check, a further step would take place to validate the measurement reports and determine if the mobile communications device 1 is in the restricted area 3. If the mobile communications device 1 is not in the restricted area 3 then the regular process would be followed, however, if the mobile communications device is in the restricted area 3 then a suitable layer three response could be issued to the mobile communication device 1 such as "congestion". This would cause the mobile communication device 1 to frequently retry, thus allowing an immediate reversion back to regular service once out of the restricted area 3.

In another example, the access control entity could be coded into the MSC 11 to extend the process CM Service Request procedures for SMS and Calls. When the mobile communications device 1 initiates a call, a CM Service Request message is sent to the base station 7. At this time the MSC 11 could wait for a set of measurement reports and determine if the mobile communications device 1 is in the restricted area 3. If not, then the normal procedure could be followed, otherwise a suitable layer three rejection message could be passed back to the MS such as "Congestion".

In yet another example, the access control entity could be coded purely into the MSC 11 provided that the BSC 9 was configured so that the Beacon ARFCN/BSIC values were treated as an inter-MSC cell list. This would not provide the complete set of measurements to the MSC 11, however, it would be a simpler implementation as the BSC 9 if correctly configured, would tell the MSC that it needed to perform an inter-MSC handover to one of the Beacons. At this point, the MSC, knowing that the handover candidate is not an actual base station 7 would simply tear down the session with a layer three Channel Release message. This method has the advantage of being able to stop a session which was established prior to a mobile communication device 1 entering into the restricted area 3.

Ideally, all three examples above could be implemented in parallel. This way you can restrict access at authentication level, setup attempt, and cease traffic that is already established. For data sessions the same process could be applied at the SGSN, or even in the IP domain provided that you could tie the IP session to an IMSI/IMEI in the restricted area.

Figure 2:
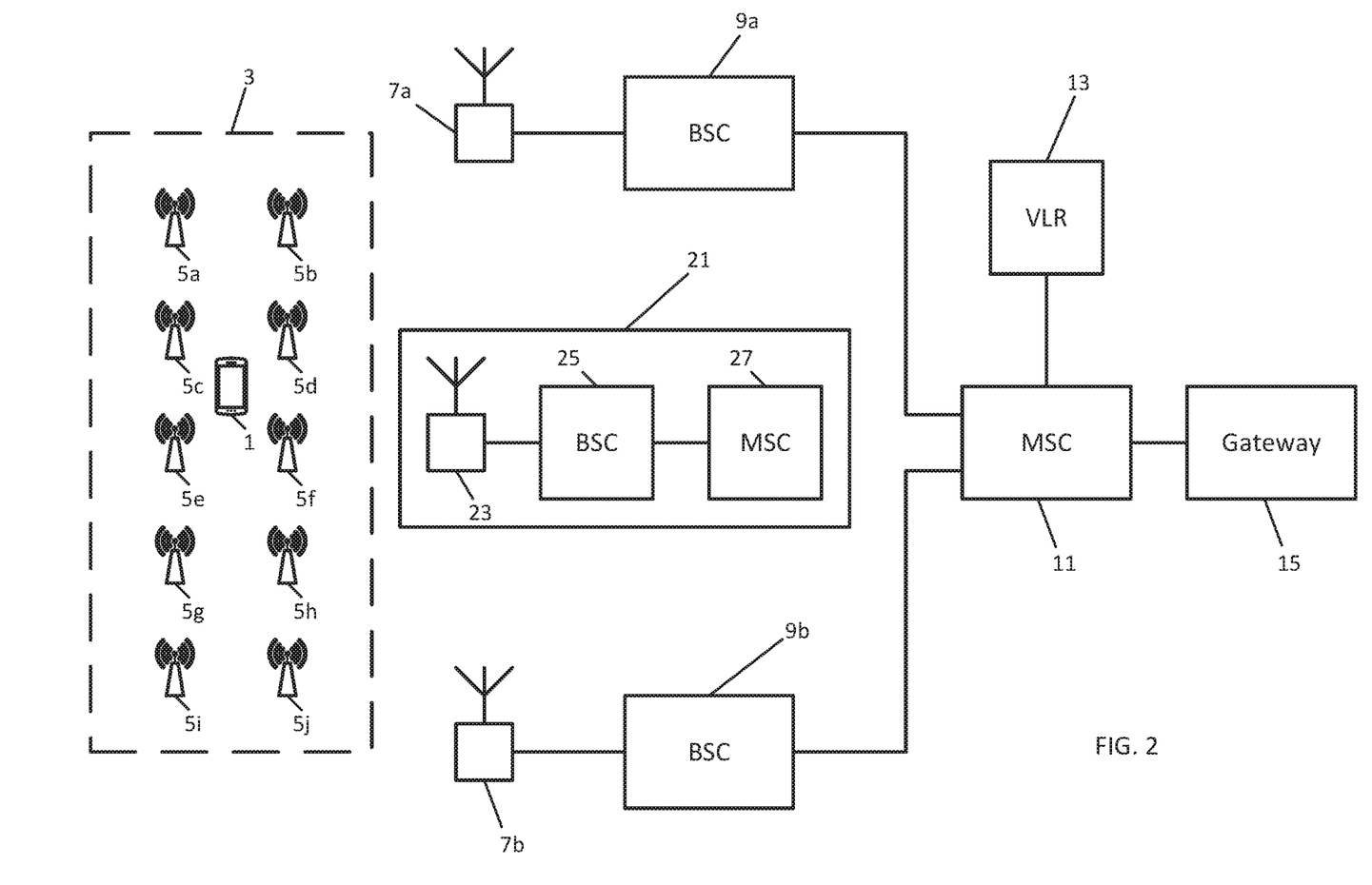
FIG. 2 schematically shows a second example of an implementation of the present invention.

In the above examples, the access control entity is implemented by a network operator after integrating associated code into their core network or radio access network or distributed between the core network and the radio access network. In alternative examples, an independent base station (that is one not forming part of the main Public Land Mobile Networks) is introduced into the network. As shown in FIG. 2, the independent base station 23 may be connected to an independent BSC 25 and an independent MSC 27. The MSC 27 may be connected to a gateway device (not shown) allowing communication with PLMNs.

The independent base station 21 has a coverage area extending over, but not necessarily limited to, the restricted area. The independent base station 21 has a different Location Area Code to the surrounding network and therefore triggers a Location Update procedure to any mobile communication device which comes into range of it. At this point, the measurement of the beacon signals from the measurement beacons 5 can be triggered, the resultant measurement data analysed and the appropriate layer three response issued to the MS. The benefit of the forced Location Update procedure is the ability to control the MS at authentication point and make it indicate "NO SERVICE" if necessary. A benefit of this approach is that it does not require any changes to the network operator's infrastructure outside the building, although it may be advantageous for neighbouring base stations preferentially to handover mobile communication devices to the independent base station.

Figure 3:
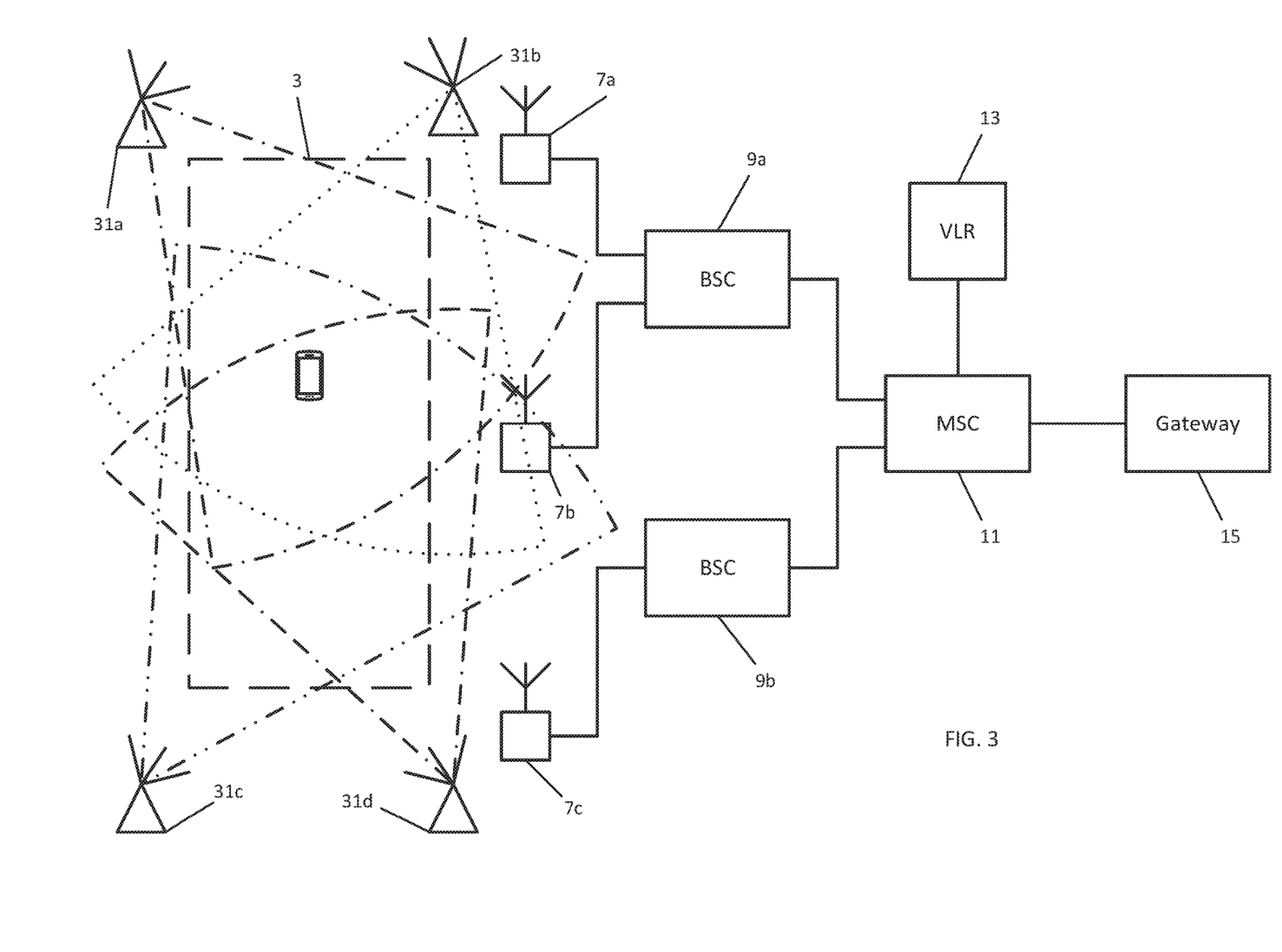
FIG. 3 schematically shows a third example of an implementation of the present invention.

As shown in FIG. 3, in another example instead of positioning measurement beacons within the restricted area 5, measurement beacons 31 with directional antennae can be provided around the periphery of the restricted area 5. The directional antenna for each measurement beacon 31 directs the associated beacon signal to the restricted area 5, and the measurement beacons 31 are arranged so that whether or not the mobile communication device 1 is within the restricted area 3 can be determined from measurements of the beacon signals.

Figure 4:
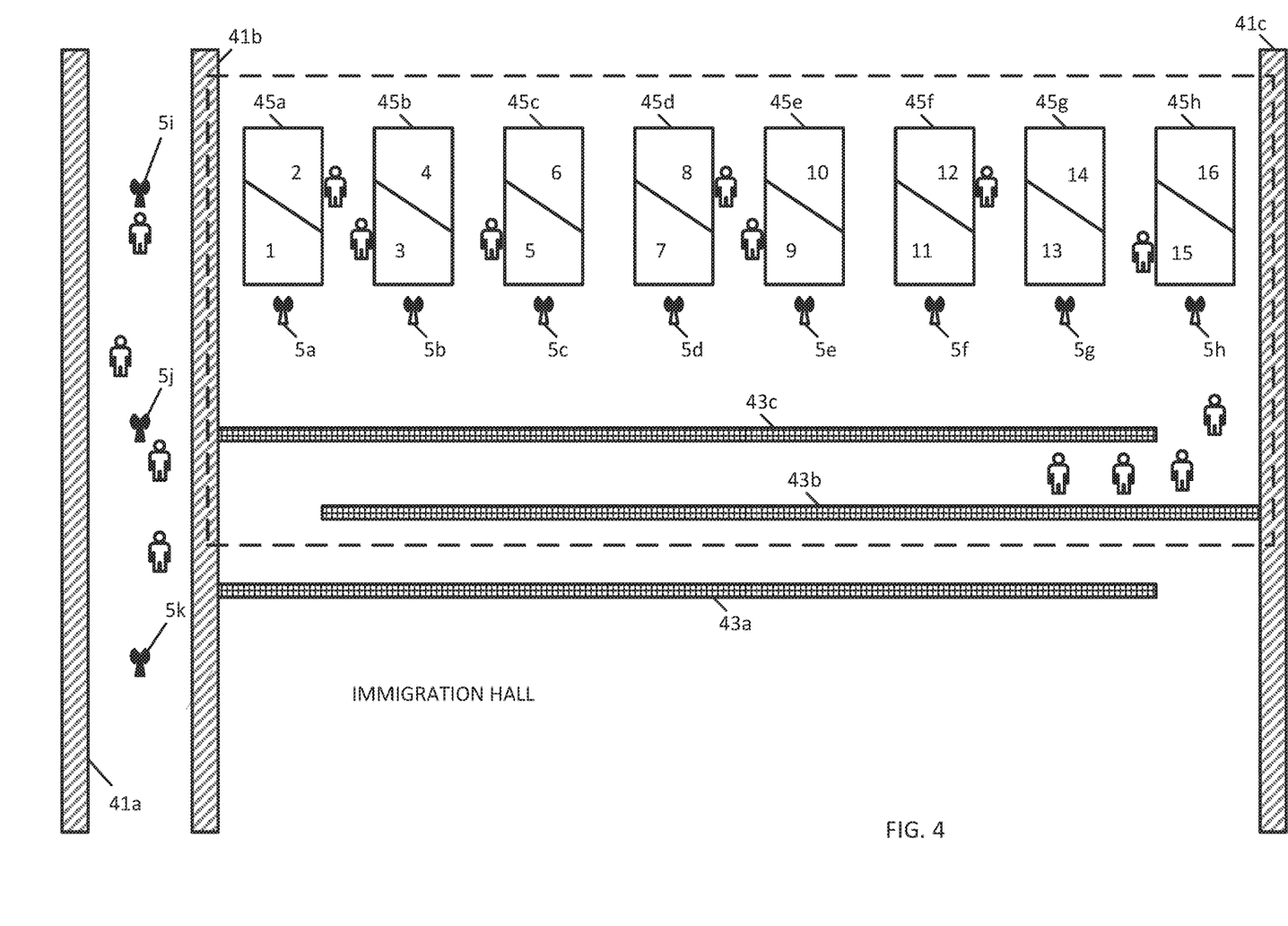
FIG. 4 shows a schematic plan view of an implementation of the present invention in the immigration hall of an airport.

One of the key advantages of this invention is the ability to tightly control a perimeter. For instance, FIG. 4 schematically shows for the immigration are example previously mentioned, an immigration hall bounded by walls 41*b* and 41*c*, with a departures lane passing nearby between walls 41*a* and 41*b*. The immigration line, guided by barriers 43*a*-43*c*, directs people to passport check booths 45*a*-45*h*, each passport check booth 45 holding two passport check positions. In this example, measurement beacons 5*a*-5*h* (hereafter referred to as deny measurement beacons) are provided adjacent the passport check booths 45 and measurement beacons 5*i*-5*k* (hereafter called override measurement beacons) are provided in the departure lane. The deny measurement beacons and the override measurement beacons are functionally identical, but the access control entity treats them differently. For example, the access control entity could apply an algorithm such as: Deny Access if any three ARFCN/BSIC combinations for deny measurement beacons have RXLEV>30, unless an ARFCN/BSIC for an override measurement beacon has an RXLEV>30, in which case allow access—this is of course possible due to the ability to uniquely identify each Beacon. Once the Beacons are installed, it would be relatively straightforward to analyse the measurements and in fact, using measurement tools at installation the radio environment could be modelled to provide detailed positioning data.

In an alternative example, no deny measurement beacons are needed but only override measurement beacons are provided, detection of one or more override measurement beacons overriding a default decision to deny access.

In an example, successive measurement reports may give different sets of BSICs and RXLEV values, indicating that the MS is in motion. Using prior knowledge of beacon placement, the speed of the MS can be estimated. In itself for some sites this may provide evidence that an MS is for example, moving by car down a road adjacent the desired restricted area, as opposed to being within the restricted area presuming that there are no parallel roads on site.

The description herein describes this technology being used in a GSM network, however, the person skilled in the art will know that it can be applied to other Radio Access Technologies (RATs). For instance to use this method in UMTS, the Beacon would have a distinct UARFCN/PSC combination, and in LTE it would have a distinct EARFCN/PCI combination. Additionally it is possible in more modern RATs to prioritise certain cells using hierarchy such as HCS. This allows the Beacons to be measured first if necessary. It is also possible in higher technology RATs to force an MS to measure a lower technology RAT cell, thus it would be possible to use GSM beacons in an LTE or UMTS network under most circumstances.

What is claimed is:

1. A system for restricting access to a mobile communications network by mobile communication devices within a restricted area, the system comprising:
   a plurality of transmitters each configured to transmit a beacon signal for reception by the mobile communication devices within the restricted area; and
   an access control entity, communicable with a mobile communication device via a base station,
   wherein:
   the access control entity is configured to decide, based on measurement data from the mobile communication device indicative of reception by the mobile communications device of the beacon signals transmitted by the plurality of transmitters, whether or not to provide the mobile communication device with access to a service of the mobile communications network;
   each transmitter is a simplex communication device arranged so that the beacon signals emulate signals emitted by base stations of the mobile communications network to indicate the presence of those base stations; and
   the access control entity is arranged to vary a time for which a dedicated channel with a mobile communications device is held open, whereby enabling a varying number of measurement reports to be received from the mobile communications device.

2. A system according to claim 1, wherein each of the plurality of transmitters transmits the beacon signal at a power of about 0 dBm.

3. A system according to claim 1, wherein each of the plurality of transmitters comprises a directional antenna.

4. A system according to claim 1, wherein the access control entity is arranged to deny access to the service of the mobile communications network under one or more conditions, the one or more conditions including if the measurement data indicates that at least one detected beacon signal satisfies a measurement condition.

5. A system according to claim 1, wherein the access control entity is arranged to allow access to the service of the mobile communications network under one or more conditions, the one or more conditions including if the measurement data indicates that at least one detected beacon signal satisfies a measurement condition.

6. A system according to claim 1, wherein the access control entity is provided in the mobile communications network.

7. A system according to claim 6, wherein the access control entity is implemented by code in a radio access network, a core network, or both the radio access network and the core network of the mobile communications network.

8. A system according to claim 1, wherein:
the mobile communications network is a first mobile communications network;
the access control entity is arranged to control access to the service provided by the first mobile communication network, and
the access control entity is provided in a second mobile communication network separate from the first mobile communication network.

9. A system according to claim 1, wherein said service is a voice call, an SMS message or a data session.

10. A system according to claim 1, wherein the measurement data is provided in a measurement report in accordance with a wireless communications standard.

11. A system according to claim 10, wherein the wireless communications standard is the GSM standard.

12. A method of restricting access to a mobile communications network by mobile communication devices within a restricted area, the method comprising:
providing a plurality of transmitters each configured to transmit a beacon signal for reception by the mobile communication devices within the restricted area;
varying a time for which a dedicated channel with a mobile communications device is held open, whereby enabling a varying number of measurement reports to be received from the mobile communications device;
receiving a measurement report from the mobile communications device, the measurement report conveying measurement data indicative of reception by the mobile communications device of the beacon signals transmitted by the plurality of transmitters; and
deciding, based on the measurement data from the mobile communication device, whether or not to provide the mobile communication device with access to a service of the mobile communications network,
wherein:
the or each transmitter is a simplex communication device arranged so that the beacon signals emulate signals emitted by base stations of the mobile communications network to indicate the presence of those base stations.

13. A method according to claim 12, wherein the transmitters are disposed within the restricted area.

14. A method according to claim 12, wherein the transmitters are disposed outside of the restricted area with directional antennas that direct the beacon signal into the restricted area.

15. A method according to claim 12, wherein the restricted area comprises an immigration hall of an airport.

* * * * *